United States Patent
Sato et al.

(10) Patent No.: US 6,610,205 B2
(45) Date of Patent: Aug. 26, 2003

(54) PROCESS FOR NITRIFYING DENITRIFYING ORGANIC WASTE WATER

(75) Inventors: Takaya Sato, Chiba (JP); Tsutomu Uehara, Chiba (JP); Hiroshi Yoshida, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 44 days.

(21) Appl. No.: 09/836,413

(22) Filed: Apr. 18, 2001

(65) Prior Publication Data

US 2001/0047960 A1 Dec. 6, 2001

(30) Foreign Application Priority Data

Apr. 25, 2000 (JP) ......................................... 2000-123842

(51) Int. Cl.⁷ .................................................. C02F 3/00
(52) U.S. Cl. ....................... 210/605; 210/620; 210/630; 210/615; 210/616; 210/617; 210/618; 210/150; 210/903; 210/905
(58) Field of Search .................................. 210/605, 620, 210/630, 615, 616, 617, 618, 150, 903, 905

(56) References Cited

U.S. PATENT DOCUMENTS

| 4,500,429 A | * | 2/1985 | Reimann et al. ............. 210/616 |
| 4,521,311 A | * | 6/1985 | Fuchs et al. ................. 210/151 |
| 4,576,718 A | * | 3/1986 | Reischl et al. ............... 210/151 |
| 4,620,929 A | * | 11/1986 | Hofmann .................... 210/610 |
| 5,980,738 A | * | 11/1999 | Heitkamp et al. ........... 210/150 |
| 6,413,427 B2 | * | 7/2002 | Tipton et al. ................ 210/151 |

FOREIGN PATENT DOCUMENTS

| EP | 0209790 | 1/1987 | |
| JP | 61287498 A | * 12/1986 | ............. C02F/3/30 |
| JP | 10136980 A | * 5/1998 | ........... C12N/11/08 |
| JP | 11226595 A | * 8/1999 | ............. C02F/3/34 |
| WO | 98/16479 | 4/1998 | |
| WO | 99/50193 | 10/1999 | |

* cited by examiner

*Primary Examiner*—Chester T. Barry
(74) *Attorney, Agent, or Firm*—Antonelli, Terry, Stout & Kraus, LLP

(57) ABSTRACT

There is disclosed a process for nitrifying denitrifying organic waste water to nitrify and denitrify the nitrogenous components in the waste water, which comprises making use of a microbe carrier composed of an organic thermoplastic high molecular compound (thermoplastic polyurethane) in both a nitrifying step and a denitrifying step, preferably in an alternate and repeated manner, wherein the compound has, in a state of complete swelling in water, a water absorption rate in the range of 50 to 3500%, a compressive yield stress of at least 1.0 MPa each being defined by a specific formula, and a particle diameter in the range of 1.0 to 30 mm. The process is capable of efficiently performing nitrifying and denitrifying steps, steadily achieving high treatment performances, contriving compactification of the treatment facility, and curtailing the treatment time and treatment cost, while the microbe carrier can withstand long-term service without any trouble.

15 Claims, 3 Drawing Sheets

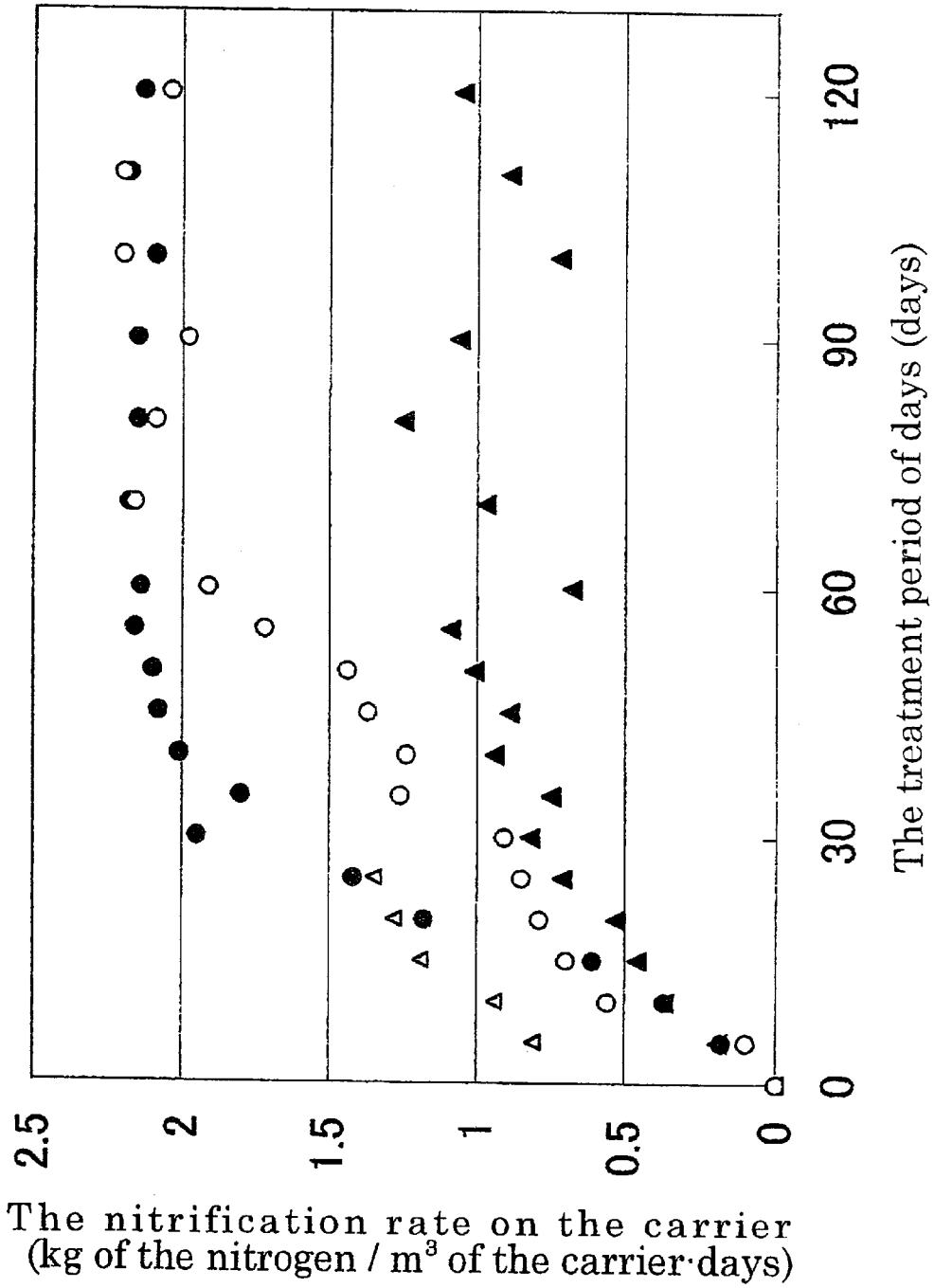
Figure 2 The relation between the treatment period of days and the nitrification rate on the carrier
● : Carrier A (Example 1)
△ : Carrier B (Comparative Example 1)
▲ : Carrier C (Comparative Example 2)
○ : Carrier A (Comparative Example 4)

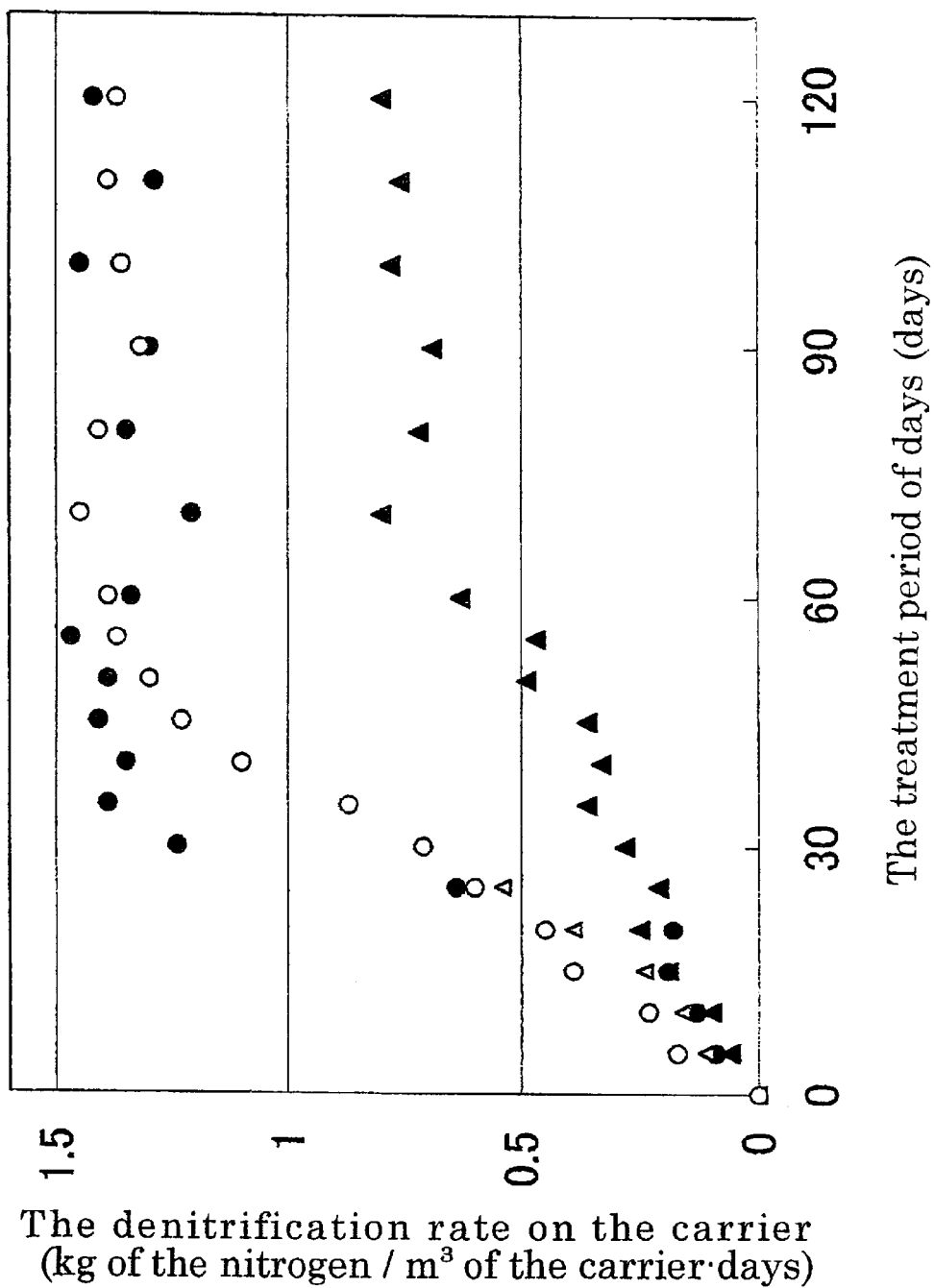
Figure 3 The relation between the treatment period of days and the denitrification rate on the carrier phase activated sludge processes, a variety of recycled nitrification/denitrification processes, a variety of intermittent aeration processes, an oxidation ditch process and the like.

PROCESS FOR NITRIFYING DENITRIFYING ORGANIC WASTE WATER

BACKGROUND OF THE INVENTION

1. Field of the Invention

The present invention relates to a process for removing nitrogenous components from organic waste water such as sewage, rural waste water, miscellaneous domestic waste water, various industrial waste water and piscicultural waste water. More particularly, it is concerned with a denitrifying activated sludge process for converting a variety of nitrogenous compounds in organic waste water into nitrogen gas by rationally combining physiological actions of nitrifying bacteria and denitrifying bacteria.

2. Description of the Related Arts

The processes for removing various nitrogenous compounds from organic waste water by converting the compounds into nitrogen gas through a denitrifying activated sludge process have hitherto been classified by the combination of two steps of nitrifycation step and denitrification step into uniphase, byphase and terphase activated sludge processes, a variety of recycled nitrification/denitrification processes, a variety of intermittent aeration processes, an oxidation ditch process and the like.

In recent years in regard to the above-mentioned processes, a process has been developed in which a microbe-immobilized carrier is introduced in a bioreaction tank for the purpose of reducing biological treatment time and miniaturizing facilities concerned. Such a microbe carrier is required to have a large specific surface area, and to be enhanced in fluidity, bioaffinity and durability each in a reactor. Thus investigations are made on various ceramics, plastics, high molecular gel and the like.

For instance, there are disclosed a conversion process for nitrogen compounds in liquids by the use of a porous carrier of cellulose derivatives in Japanese Patent Application Laid-Open No.256773/1996 (Heisei-8); a microbe carrier which is made of polypropylene (PP) blended with affinitive high molecular compounds in Japanese Patent Application Laid-Open No. 180280/1998 (Heisei-10); a process for removing nitrogenous components in waste water by using a high molecular gel carrier in which nitrifying bacteria, iron oxidation bacteria and denitrifying bacteria were entrappingly immobilized in Japanese Patent Application Laid-Open No. 180291/1998 (Heisei-10); and a process for nitrifying denitrifying organic waste water by the use of a polyvinyl alcohol(PVA)-based hydrous gel simultaneously imparted with nitrification and denitrification performances in Japanese Patent Application Laid-Open No. 314782/1998 (Heisei-10).

However, a denitrifying activated sludge process prolongs an aerobic tank sludge retention time(hereinafter referred to as "A-SRT") required for nitrification longer than the A-SRT required for BOD removal, thus necessitating a denitrification tank, whereby the retention time in biotreatment tanks as a whole is unfavorably prolonged longer than a standard activated sludge process. Further, the mixed liquid suspended solid concentration (hereinafter referred to as "MLSS concentration") of activated sludge in biotreatment tanks is increased as high as 2500 to 3000 mg/L higher than in a standard activated sludge process. Accordingly, it is necessary to set the water surface loading therein to a value lower than that in a standard activated sludge process.

In view of the foregoing, in the case of carrying out a denitrifying activated sludge process by the use of an existing treatment unit of a standard activated sludge process, it needs only to increase the amount of microbes in a biotreatment tank by adding a microbe carrier in the tank without increasing MLSS concentration. An example of adding a microbe carrier in a denitrifying activated sludge process is intended mainly to promote nitrification, and the addition of a microbe carrier in an aerobic tank can maintain autotrophic nitrifying bacteria at a high concentration and enhance nitrification performance. In order to further increase the amount of microbes in a tank, it becomes necessary to add a microbe carrier in an anaerobic tank. As to only few examples described above which have hitherto been found, the following reasons are taken into consideration:

① In an anaerobic tank, where aerational agitation is unusable, a mechanical agitation unit is majorly employed. However, the above-mentioned high molecular gel carrier is unendurable to long-term mechanical agitation because of its low physical strength. On the other hand, a carrier composed of ceramics or plastics has high endurance, but low affinity for denitrifying bacteria, thereby the bacteria must be retained in the form of being caught on the uneven portion of the carrier. As a result, there occurs the floatation of the carrier due to nitrogen gas.

② Nitrogen gas which is formed by the metabolism of microbes in a denitrification step causes floatation of the carrier, since bubbles are attached to the above-mentioned carrier made of PP or porus carrier which has each numerous uneven portions and a large amount of SS retained.

③ Since heterotrophic anaerobic bacteria such as denitrifying bacteria are prone to form granule, the above-mentioned carrier made of ceramics or plastics having low biocompatibility causes the immobilized microbes to peel off, thus instabilizing the treatment performance.

④ A method for entrappingly immobilizing the microbes such as denitrifying bacteria on the above-mentioned high molecular gel is not practical, since a process for producing the carrier, a preservation method and a transport method are made intricate and troublesome.

SUMMARY OF THE INVENTION

In such circumstances, an object of the present invention is to develop a nitrifying denitrifying process which is capable of solving the aforesaid problems of the prior arts; efficiently carrying out the nitrifying denitrifying steps, while a microbe carrier can withstand long-term service; steadily achieving high treatment performances; contriving the compactification of the treatment facility; and thus curtailing the treatment time and treatment cost.

Other objects of the present invention will be obvious from the text of this specification hereinafter disclosed.

The present invention has been accomplished on the basis of such findings that by using the same microbe carrier under both aerobic and anaerobic conditions, it is made possible to firmly immobilize the microbes on the surface of a carrier and thus perform efficient nitrification along with denitrification.

That is to say, the present invention provides a process for nitrifying denitrifying organic waste water to nitrify and denitrify the nitrogenous components in the waste water, which comprises making use of a microbe carrier composed of an organic thermoplastic high molecular compound in both a nitrifying step and a denitrifying step, wherein the compound has, in a state of complete swelling in water, a water absorption rate as defined by the formula (1) being in the range of 50 to 3500%, a compressive yield stress as defined by the formula (2) being at least 1.0 MPa and a particle diameter being in the range of 1.0 to 30 mm;

water absorption rate (%)={weight upon complete swelling in water(g)−bone dry weight(g)}×100/bone dry weight(g)  (1)

$$\sigma = F/A \tag{2}$$

where σ is the compressive yield stress (MPa) of the carrier;
F is the compressive load (N) upon the compressive collapse of the carrier; and
A is the projected area (mm$^2$) of the carrier before compression test.

Moreover, the present invention further provides a process for nitrifying denitrifying organic waste water which comprises continuously or intermittently feeding the waste water to be treated in a treatment tank under the state of a microbe carrier being retained in the treatment tank, while alternately and repeatedly switching treatment conditions between nitrification and denitrification.

BRIEF DESCRIPTION OF THE DRAWINGS

FIG. 2 is a graph showing the relation between the treatment period of days and nitrification rate on the carrier as the results of Example 1 and Comparative Example 1, 2 and 4; and FIG. 3 is a graph showing the relation between the treatment period of days and denitrification rate on the carrier as the results of Example 1 and Comparative Example 1, 2 and 5, wherein the symbols therein shall have the following designations:

Figure 1:
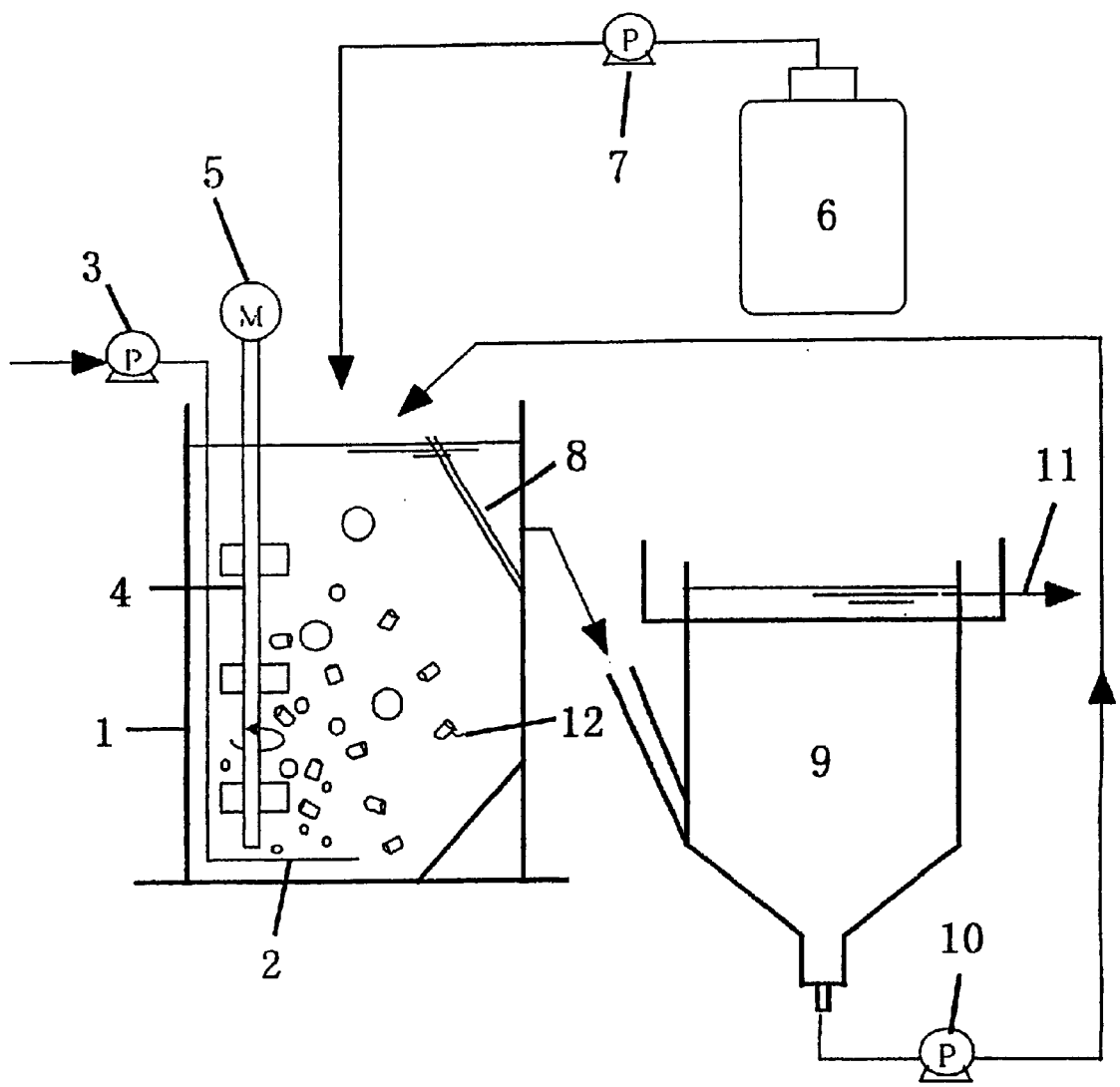
FIG. 1 is a simplified process flow diagram showing one embodiment of a nitrifying denitrifying apparatus according to the present invention.

1: biotreatment tank
2: air diffusion pipe
3: aeration pump
4: agitation impeller
5: agitation motor
6: raw water tank
7: liquid transfer pump
8: carrier separation screen
9: settling tank
10: sludge return pump
11: discharge line
12: carrier

DESCRIPTION OF PREFERRED EMBODIMENTS

The carrier to be used in the present invention, which is composed of an organic thermoplastic high molecular compound, may be selected for use from any of organic high molecular compounds, provided that it inherently absorbs water and swells in water on absorption without being dissolved therein, and besides it is thermoplastic. In particular, the water swellable and thermoplastic polyurethane as disclosed in Japanese Patent Application Laid-Open No. 136980/1998 (Heisei-10) is preferable. The polyurethane just mentioned may be blended with an other thermoplastic high molecular compound. Because of its being thermoplastic, the organic high molecular compound to be used in the present invention is enhanced in moldability, and thus can be readily and conveniently made into granular products having almost uniform particle diameter by a conventional method such as extrusion molding and injection molding.

The configuration of the carrier to be used in the present invention is not specifically limited, provided that particle diameter thereof is almost uniform, and is preferably spherical, cubic or columnar. In the case of enlarging particle diameter of the carrier, it is preferable that the cross-section thereof be odd-shaped or irregular such as cylindrical shape to the extent that bubbles are not attached thereto upon aerational agitation or mechanical agitation, since the specific surface area thereof is enlarged.

Moreover, being available in a dry condition, the carrier to be used in the present invention is advantageous in regard to preservation and transport. The carrier, when placed in a bioreactor, absorbs water and swells therein, and thereby functions as a carrier.

The carrier to be used in the present invention has, in a state of complete swelling in water, a water absorption rate as defined by the formula (1) being in the range of preferably 50 to 3500%, more preferably 500 to 3000%:

water absorption rate (%)={weight upon complete swelling in water (g)−bone dry weight(g)}×100/bone dry weight (g)  (1)

where, the weight upon complete swelling in water is the weight which does not change any longer when being immersed in pure water at 25° C., and the bone dry weight is the weight which does not change any longer when being dried at 100° C.

The water absorption rate as defined above, when being less than 50%, causes low hydrophilicity of the carrier surface and low affinity for microbes, whereby once immobilized microbes become more prone to be peeled off by agitation and/or flow of fluids; and besides causes the specific gravity of the carrier during service to approach that of the organic thermoplastic high molecular compound itself, thereby necessitating a special processing of the carrier such that the specific gravity of the carrier is made to approach 1.0 to facilitate flowing in water. On the other hand, the water absorption rate, when being more than 3500%, brings about marked decrease in physical strength and inferior durability.

The carrier to be used in the present invention has, in a state of complete swelling in water, a compressive yield stress as defined by the formula (2) being at least 1.0 MPa, preferably at least 3.0 MPa:

$$\sigma = F/A, \tag{2}$$

where σ is the compressive yield stress (MPa) of the carrier;
F is the compressive load (N) upon the compressive collapse of the carrier; and
A is the projected area (mm$^2$) of the carrier before compression test.

A carrier having a compressive yield stress as defined above being less than 1.0 MPa gives rise to a fear that the carrier is crushed upon mechanical agitation, or abraded into small sizes during flowing, thus flowing away from a carrier separation screen.

The compressive load upon the compressive collapse of the carrier is measured by using a microbe carrier under working conditions at a testing velocity of 1 mm/min in accordance with ISO-604 (JIS-K7181) "Testing method for plastics-compression characteristics". The projected area of the microbe carrier is determined by taking an enlarged photograph of the carrier before the test from above and treating the image thus taken.

The carrier to be used in the present invention has, in a working state, that is, in a state of complete swelling in water, a particle diameter being in the range of preferably 1.0 to 30 mm, more preferably 3.0 to 10 mm. The particle diameter, when being smaller than 1.0 mm, gives rise to a difficulty in separating the carrier from waste water, whereas the diameter, when being larger than 30 mm, causes decrease in specific surface area thereof and decrease in immobilization area of the microbe, thus unfavorably lowering the effect of adding the carrier.

As described hereinbefore, the carrier to be used in the present invention is composed preferably of a thermoplastic high molecular compound, especially thermoplastic polyurethane. The aforesaid polyurethane is the polyurethane copolymer comprising a soft segment which is randomly top-to-end bonded by urethane bond and a hard segment. The aforesaid polyurethane copolymer is synthesized by reacting a bifunctional long chain diol compound, a bifunctional diisocyanate compound and a short chain compound having a group which can react with two isocyanate groups.

The soft segment which is obtained by the reaction between the long chain diol compound and the diisocyanate compound is represented by the following formula (3):

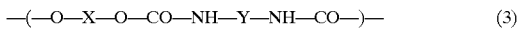

—(—O—X—O—CO—NH—Y—NH—CO—)—     (3)

wherein X is the group which is generated by the reaction of the terminal hydroxy groups of the long chain diol compound with the isocyanate, and from which the terminal hydroxy groups are removed, and Y is the group which is generated by the reaction of the diisocyanate compound having a number average molecular weight in the range of 100 to 1000 with the hydroxy groups, and from which the isocyanate groups are removed.

It is thought that the molecular weight of X in the above-mentioned formula (3) exerts a remarkable influence on the water absorption rate, physical properties, and the like of the carrier to be used in the present invention. The number average molecular weight thereof is in the range of preferably 1,000 to 13,000, more preferably 4,000 to 8,000. The molecular weight of X, when being unreasonably low, causes decrease in the molecular weight of the segment and as a result, brings about the tendency that the water absorption rate is lowered, thereby unreasonably increasing the specific gravity of the carrier during use. On the contrary, the molecular weight of X, when being higher than 13,000, causes such unfavorable problems as an increase in the viscosity of reactants at the time of synthesis and a rise in melting temperature.

The hard segment which is obtained by the reaction between the short chain compound having a group which can react with two isocyanate groups and the isocyanate compound is represented by the following formula (4) or (5):

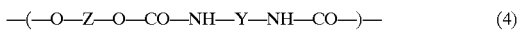
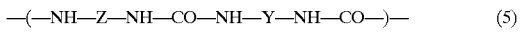

—(—O—Z—O—CO—NH—Y—NH—CO—)—     (4)

—(—NH—Z—NH—CO—NH—Y—NH—CO—)—     (5)

wherein Y is as previously defined, and Z is the group which is generated by the reaction of the terminal hydroxy groups of the short chain diol compound having a number average molecular weight in the range of 30 to 400 with the isocyanate, and from which the terminal hydroxy groups are removed.

As the long chain diol compound to be used for producing the foregoing thermoplastic polyurethane, there is preferably usable a water-soluble polyoxyalkylene diol, and particularly preferably usable a water-soluble ethylene oxide-propylene oxide copolymer polyether-based diol having two terminal hydroxy groups in one molecule, or polyethylene glycol. In particular, the content of the ethylene oxide is preferably at least 70%, more preferably at least 85%. The content of ethylene oxide of less than 70% sometimes leads to a carrier lowered in water absorption rate.

Specific examples of the diisocyanate compounds include tolylene diisocyanate, xylylene diisocyanate, naphthylene diisocyanate, diphenylmethane diisocyanate, biphenylene diisocyanate, diphenyl ether diisocyanate, tolidine diisocyanate, hexamethylene diisocyanate and isophorone diisocyanate.

Examples of the short chain diol compound include ethylene glycol; 1,2-propylene glycol; 1,3-propylene glycol; 1,3-butanediol; 2,3-butanediol; 1,4-butanediol; 1,5-pentanediol; 1,6-hexanediol; 2,2-dimethy-1,3-propanediol; diethylene glycol; dipropylene glycol; 1,4-cyclohaxane dimethanol; 1,4-bis-(β-hydroxyethoxy)benzene; p-xylilenediol; phenyldiethanolamine; methyldiethanolamine; 3,9-bis-(2-hydoxy-1,1-dimethylethyl)-2,4,8,10-tetraoxaspiro(5,5)-undecane; etc.

In the production of the thermoplastic polyurethane to be used in the present invention, the compositional ratio of the long chain diol compound to the short chain compound having a group which can react with two isocyanate groups can be varied according to the molecular weight of each, desirable physical properties of the carrier and the like. Although depending on the molecular weight of the long chain diol compound, the molar ratio of the long chain diol compound to the short chain compound is preferably in the range of 5:1 to 1:2. In the case where the long chain diol compound has a high molecular weight, since the viscosity at the time of synthesizing the thermoplastic polyurethane is apt to become high, it is preferable to decrease the molar ratio of the short chain compound which forms the hard segment. However, in order to enhance water absorption rate, while maintaining high physical strength, it is preferable to increase the molar ratio thereof.

In addition, it is preferable that the ratio of the number of the isocyanate groups in the diisocyanate compound to the total number of the functional groups in the long chain compound and the short chain compound be in the range of preferably 0.95 to 1.8, more preferably 1.0 to 1.6. As such there are usable in the present invention, not only polyurethane copolymers wherein the polymer synthesis reaction has sufficiently been completed, but also incomplete thermoplastic polyurethane, that is, polyurethane copolymers wherein part of isocyanate groups remain unreacted, by causing the incomplete polyurethane to be cross-linked after molding.

As the method for producing the thermoplastic polyurethane to be used in the present invention by means of synthesis, there are adoptable both a prepolymer method in which the long chain diol compound and diisocyanate compound are reacted in advance, and thereafter the reaction product is reacted with a short chain compound as a chain extender which has a group capable of reacting with two isocyanate groups; and a one shot method in which all the starting reactants are simultaneously mixed.

Moreover, it is possible to blend an other thermoplastic resin with the thermoplastic polyurethane to be used in the present invention for the purpose of altering the specific gravity thereof in water and/or improving the moldability. The thermoplastic resin to be blended therewith is not specifically limited provided that the resin is compatible with the polyurethane. Of these, polyether-based thermoplastic polyurethane is preferable. The foregoing thermoplastic polyurethane, when being blended with the resin, is contained in an amount of preferably at least 30% by weight, further preferably at least 50% by weight. The content of the same, when being less than 30% by weight, results in lowered water absorption rate of the organic thermoplastic high molecular compound thus blended, thereby lowering the affinity for the microbes.

It has been confirmed that the carrier composed of the above-mentioned organic thermoplastic high molecular compound, which has physical strength and durability that can withstand a long-term mechanical agitation and besides, has a high molecular gel structure upon swelling by water absorption, is capable of firmly bonding and immobilizing denitrifying bacteria without installing an uneven portion. Further, the carrier to be used in the present invention, which is usable in both nitrification step as an aerobic condition and denitrification step as an anaerobic condition, is applicable to a variety of denitrifying activated sludge process. In particular, compared with various modified carrier addition-recycled nitrification/denitrification process in which different carriers are separately added to an anaerobic tank and an aerobic tank, respectively, and thus countercurrent carrier return is required, the process according to the present invention dispenses with the distinction between an anaerobic carrier and an aerobic carrier and can perform carrier return in the same manner as nitrifying liquid circulation. In addition, the present process is well suited for various intermittent aeration method and oxidation ditch method.

It is made possible in the process according to the present invention, for instance, to alternately and repeatedly make use of the same microbe carrier in both the nitrification condition and denitrification condition by a method comprising supplying waste water to be treated continuously or intermittently into a treatment tank, and alternately and repeatedly switching the treatment conditions between the nitrification condition and denitrification condition in a state that the microbe carrier composed of organic thermoplastic high molecular water-swellable compound is retained in a treatment tank. In this case there is no restriction on the number of cycles or one cycle time for aerobic and anaerobic cycles.

In an example of adding the microbe carrier to denitrifying activated sludge process unit, there exists the problem in that long-term acclimatization is necessary in the early stage of operation. A solution thereagainst has hitherto been contrived by the use of a entrappingly immobilized carrier. Nevertheless, by using the microbe carrier under both environments including aerobic and anaerobic conditions in the process according to the present invention, it is made possible not only to obtain the microbe carrier imparted with nitrification and denitrification performances, but also to accelerate the rise in an early stages of nitrification and denitrification as compared with the case of acclimatization under either condition only, thereby enabling to shorten the acclimatization term.

When the microbe carrier to be used in the present process is acclimatized in a coexistence of activated sludge under an aerobic condition wherein nitrifying bacteria are proliferated, the nitrifying bacteria are thickly grown on the surface of the carrier, and also protozoa such as ciliates are thickly grown thereon as if they cover the bacteria. It has been found by the present inventors that when the aerobic condition is switched to the anaerobic condition wherein denitrifying bacteria are proliferated, the denitrifying bacteria are adsorbed onto the carrier and thereby are firmly immobilized thereon. It has been confirmed that this phenomenon is not limited to one cycle only, and that both the rises of nitrification and denitrification performances are accelerated at every time the aerobic and anaerobic conditions are alternately repeated. It is considered to relate to the cohesive force among the microbes themselves and the denitrifying bacteria being so-called anaerobic.

In the following, the present invention will be described more specifically with reference to the drawings.

FIG. 1 is a simplified process flow diagram showing one embodiment of a nitrifying denitrifying apparatus according to the present invention. In FIG. 1, a biotreatment tank 1 is equipped inside with an air diffusion pipe 2, an agitation impeller 4 and further a microbe carrier 12. When the inside of the biotreatment tank 1 is brought to an aerobic condition, an aeration pump 3 is operated and air is blown therein through the air diffusion pipe 2 to carry out aeration. When the inside thereof is brought to an anaerobic condition, an agitation motor 5 is operated to operate the agitation impeller 4 so as to mix raw water (waste water to be treated), activated sludge and the carrier 12 in the biotreatment tank 1, while the raw water is allowed to flow into the biotreatment tank 1 from a raw water tank 6 via a liquid transfer pump 7. Irrespective of aerobic or anaerobic condition, organic matters in the raw water are decomposed by the activated sludge in the biotreatment tank 1 and the microbe which is immobilized on the carrier 12, and simultaneously organonitrogen components are decomposed into ammonia nitrogen.

Subsequently upon becoming aerobic state, by the action of the nitrifying bacteria bonded to the carrier 12, the ammonia nitrogen begins to be oxidized and converted to nitrate nitrogen and nitrite nitrogen. Subsequently upon becoming anaerobic state denitrifying bacteria become predominant on the surface of the carrier 12, so that the nitrate nitrogen and nitrite nitrogen are decomposed finally into nitrogen gas by the action of the bacteria. The above-mentioned denitrifying treatment is put into practice by continuously or intermittently supplying the bio-treatment tank 1 with raw water and alternately repeating the aerobic state and anaerobic state.

The treated waste water flows out through overflow from the biotreatment tank 1 to a settling tank 9, while the carrier 12 is made to always stay in the biotreatment tank 1 by a carrier separation screen 8, whereby the microbe concentration in the biotreatment tank 1 is maintained at a high level irrespective of the flow rate of the raw water. The activated sludge and the treated waste water are separated from each other by gravity settling in the settling tank 9, and thus only the treated waste water is discharged from a discharge line 11 to the outside of the treatment system. The activated sludge thus settled is returned to the biotreatment tank 1 via a sludge return pump 10 to maintain the MLSS concentration therein. The denitrifying bacteria and nitrifying bacteria having a low proliferating rate are maintained at high concentrations by the carrier 12, whereby the sludge control in the present process is more easy than in conventional standard processes.

As described hereinbefore, the process according to the present invention enables nitrification and denitrification of carrier addition system through intermittent aeration without exchanging the microbe carrier. Without being confined to the foregoing intermittent aeration, it is made possible to apply the process to various modified recycled nitrification/denitrification process, oxidation ditch process and the like process.

In summarizing the effect of the present invention, by using the same microbe carrier composed of organic thermoplastic high molecular compounds having specific physical properties in both nitrification and denitrification steps for denitrifying activated sludge process, it is made possible to dispense with the distinction of carrier per each step and the distinction of carrier between an aerobic tank and an anaerobic tank and also to perform carrier return and nitrifying liquid circulation in the same way, thereby enabling to contrive the rationalization and compactification of treatment facilities and to curtail the treatment time and the treatment expense. Further by using the same microbe carrier in both environments including aerobic and anaerobic conditions, it is made possible not only to obtain the microbe carrier imparted with nitrification and denitrification performances but also to promote the rise in early stages of nitrification and denitrification performances as compared with the case of the acclimatization in either environment only, to shorten the acclimatization term and to firmly immobilize the microbe on the surface of the carrier without being peeled off as compared with the case where use is made of the carrier in either environment only. Further the present process, which dispenses with distinction of the carrier per each step, is applicable to a process of performing nitrification and denitrification by using a single tank such as intermittent aeration process and oxidation ditch process.

In the following, the present invention will be described in more detail with reference to comparative examples and working examples, which however shall not limit the present invention thereto.

PREPARATION EXAMPLE 1

Preparation of Carrier Composed of Thermoplastic Polyurethane

In a reaction kettle equipped with an agitator was placed 100 parts by weight of polyethylene glycol having an average molecular weight of 2000 as the long chain diol compound. Then preliminary heating was carried out at 110° C. for one hour in an atmosphere of nitrogen so as to release the moisture in the polyethylene glycol, and thereafter the reaction kettle was set to a temperature of 130° C. Subsequently in the reaction kettle was added 25 parts by weight of 4,4'-diphenylmethane diisocyanate as the diisocyanate compound under stirring for 2 hours to proceed with prepolymerization reaction. After the completion of the prepolymerization reaction, 1.19 part by weight of 1,4-butanediol as the chain length extender was added with stirring for one hour. The series of the reaction after the preliminary heating was carried out at 130° C. After the completion of the reaction, the reaction product was cast onto a vat which had been subjected to releasing treatment, followed by heating treatment at 100° C. for 4 hours to obtain thermoplastic polyurethane resin composition.

The thermoplastic polyurethane resin composition prepared in this manner was allowed to cool, then crushed into small pieces, heat melted at 180 to 230° C. by the use of an heating extruder under shearing force applied thereto, and extruded through the nozzles of the extruder to prepare strands of 2.5 mm in diameter. The strands thus obtained were cut into columnar resin moldings of 2.5 mm in length, which were immersed in water, and allowed to swell to prepare a carrier in the form of columns which had a diameter and length of about 4 mm, respectively, a water absorption rate of 350% and a compressive yield stress of 10 MPa.

PREPARATION EXAMPLE 2

Preparation of Carrier Composed of Thermoplastic Polyurethane

The procedure in Example 1 was repeated to prepare a carrier, except that there were used 100 parts by weight of polyethylene glycol having an average molecular weight of 6000 as the long chain diol compound, 8.3 parts by weight of 4,4'-diphenylmethane diisocyanate as the diisocyanate compound and 0.4 part by weight of 1,4-butanediol as the chain length extender. The resultant carrier had a diameter and length of about 4 mm, respectively, a water absorption rate of 1500% and a compressive yield stress of 3.0 MPa each in a state of complete swelling in water.

PREPARATION EXAMPLE 3

Preparation of Carrier Composed of Thermoplastic Polyurethane

The procedure in Example 1 was repeated to prepare a carrier, except that there were used 100 parts by weight of polyethylene glycol having an average molecular weight of 10000 as the long chain diol compound, 5.0 parts by weight of 4,4'-diphenylmethane diisocyanate as the diisocyanate compound and 0.24 part by weight of 1,4-butanediol as the chain length extender. The resultant carrier had a diameter and length of about 4 mm, respectively, a water absorption rate of 2500% and a compressive yield stress of 1.2 MPa each in a state of complete swelling in water.

PREPARATION EXAMPLE 4

Preparation of Carrier Composed of Thermoplastic Polyurethane

The procedure in Example 1 was repeated to prepare a carrier, except that there were used 100 parts by weight of polyethylene glycol having an average molecular weight of 6000 as the long chain diol compound, 8.3 parts by weight of 4,4'-diphenylmethane diisocyanate as the diisocyanate compound and 1.53 part by weight of 1,4-butanediol as the chain length extender. The resultant carrier had a diameter and length of about 4 mm, respectively, a water absorption rate of 1300% and a compressive yield stress of 4.9 MPa each in a state of complete swelling in water.

PREPARATION EXAMPLE 5

Preparation of Carrier Composed of Thermoplastic Polyurethane

The procedure in Example 1 was repeated to prepare a carrier, except that there were used 100 parts by weight of polyether diol (EO/PO=7/3) having an average molecular weight of 6000 as the long chain diol compound, 8.3 parts by weight of 4,4'-diphenylmethane diisocyanate as the diisocyanate compound and 0.4 part by weight of 1,4-butanediol as the chain length extender. The resultant carrier had a diameter and length of about 4 mm, respectively, a water absorption rate of 300% and a compressive yield stress of 10 MPa each in a state of complete swelling in water.

PREPARATION EXAMPLE 6

Preparation of Carrier Composed of Thermoplastic Polyurethane

The procedure in Example 1 was repeated to prepare a carrier, except that there were used 100 parts by weight of polyether diol (EO/PO=5/5) having an average molecular weight of 6000 as the long chain diol compound, 8.3 parts by weight of 4,4'-diphenylmethane diisocyanate as the diisocyanate compound and 0.4 part by weight of 1,4-butanediol as the chain length extender. The resultant carrier had a diameter and length of about 4 mm, respectively and a water absorption rate of 20% each in a state of complete swelling in water.

PREPARATION EXAMPLE 7

Preparation of Carrier Composed of Polyvinyl Alcohol Gel Cured by Ionic Cross-linking Polyvinyl alcohol in the form of powder (degree of polymerization of 2000, degree of saponification of 99.8%) was dissolved in water to prepare 500 g of aqueous solution of polyvinyl alcohol having a concentration of 12% by weight. To the solution was added 250 g of sodium alginate of 4% by weight with stirring. To the resultant mixed solution was added 250 g of the slurry having a sludge concentration of 8000 mg/l which had been prepared by concentrating activated sludge (sludge concentration of 1500 mg/l) in the activated sludge unit for waste water treatment in Tokyo Factory of Nisshinbo Industries Inc. with stirring to obtain uniform mixed sludge. To the resultant mixed sludge was added dropwise through a nozzle the solidified liquid in the form of aqueous solution of boric acid having a concentration of 12 mg/l and calcium chloride having a concentration of 30 mg/l. The solution added dropwise was solidified in the form of sphere. The resultant gel was taken out, transferred to a saturated solution of sodium sulfate, and allowed to stand for 2 hours to obtain a carrier composed of polyvinyl alcohol gel in the form of sphere, which had a diameter of about 4 mm and a compressive yield stress of 0.02 MPa.

PREPARATION EXAMPLE 8

Preparation of Carrier Composed of Cross-linking Polyethylene Glycol Gel

In 84.4 parts by weight of water were dissolved 15 parts by weight of non-thermoplastic three-dimentionally cross-linking polyethylene glycol dimethacrylate (manufactured by Shin Nakamura Chemical Industries Co.,Ltd. under the trade name "23G") and 0.6 part by weight of dimethylaminopropyl nitrile. To the resultant mixture was added 35 parts by weight of 0.2% aqueous solution of potassium persulfate with vigorous stirring. Thereafter the mixture was cast into a mold and made to gel. The gel was taken out of the mold and cut into squares of 4 mm to produce a carrier composed of polyethylene glycol gel, which had a compressive yield stress of 0.01 MPa.

PREPARATION EXAMPLE 9

Preparation of Carrier Composed of Polypropylene

A mixture produced by sufficiently mixing 90 parts by weight of polypropylene pellet, 5 parts by weight of starch and 5 parts by weight of barium sulfate was molded with an extruder, into hollow cylindrical pellets each measuring 4 mm in diameter and 5 mm length to produce a hollow carrier composed of polyproylene, which had a compressive yield stress of 4.5 MPa.

In Table 1 are given the chemical composition ratio, water absorption rate and compressive yield stress of each of the carriers obtained in each of the above-described preparation examples. In the table, MDI means diphenylmethane diisocyanate, and 1,4-BDO means 1,4-butanediol.

TABLE 1

| No. of Preparation Example | Diol molecular weight | Diol EO/PO ratio | Diol parts by wt/mol | MDI parts by wt/mol | 1,4-BDO parts by wt/mol | NCO/OH ratio | Water absorption rate (%) | Compressive yield stress (MPa) |
|---|---|---|---|---|---|---|---|---|
| 1 | 2000 | 10/0 | 100/1 | 25/2 | 1.19/0.25 | 1.6 | 350 | 10 |
| 2 | 6000 | 10/0 | 100/1 | 8.3/2 | 0.4/0.25 | 1.6 | 1500 | 3.0 |
| 3 | 10000 | 10/0 | 100/1 | 5.0/2 | 0.24/0.25 | 1.6 | 2500 | 1.2 |
| 4 | 6000 | 10/0 | 100/1 | 8.3/2 | 1.53/1 | 1.0 | 1300 | 4.9 |
| 5 | 6000 | 7/3 | 100/1 | 8.3/2 | 0.4/0.25 | 1.6 | 300 | 10 |
| 6 | 6000 | 5/5 | 100/1 | 8.3/2 | 0.4/0.25 | 1.6 | 20 | — |
| 7 | Polyvinyl alcohol gel curable by crosslinking | | | | | | | 0.02 |
| 8 | Crosslinking type polyethylene glycol gel | | | | | | | 0.01 |
| 9 | Hollow pellet made of polypropylene | | | | | | | 4.5 |

TESTING EXAMPLE

Comparison of Anti-abrasion Strength of Carrier

The following abrasion acceleration test was carried out for the carriers in Preparation Examples 1, 2, 3, 7 and 8. The results are given in Table 2.

One hundred (100) carrier specimens each in a state of complete swelling in water were placed in a graduated cylinder filled in with pure water and the volume of the specimens were measured. The specimens after the measurement were transferred to a cylindrical polystyrene-made vessel of 115 mm in inside diameter, 105 mm in height and 1090 ml in internal volume which had a screwed mouth, was lined inside with waterproof sandpaper having a particle size of 100#, and was filled in with pure water. Into the vessel was inserted an agitational propeller having three impellers of 100 mm in diameter, which was then rotated at a velocity of 400 rpm to agitate the content therein. After 168 hours of agitation, the carrier specimens were taken out from the vessel, and passed in part through a sieve with an aperture of 1 mm. A measurement was made of the volume of the specimens left on the sieve by the use of the graduated cylinder, and the survival rate was calculated by the following formula:

Survival rate (%)=volume of the specimens left on the sieve after agitation ($cm^3$)×100/volume of the specimens before the test ($cm^3$)

TABLE 2

| Type of carrier | Survival rate (%) after abrasion test |
|---|---|
| Preparation Example 1 | 95 |
| Preparation Example 2 | 95 |
| Preparation Example 3 | 90 |

TABLE 2-continued

| Type of carrier | Survival rate (%) after abrasion test |
|---|---|
| Preparation Example 7 | <10 |
| Preparation Example 8 | <5 |

It has been proved from the results in Table 2 that the carriers in Preparation Examples 1 through 3 have each a high survival rate after abrasion test and thus excellent durability, whereas the carriers in Preparation Examples 7 and 8 have each an extremely low survival rate after abrasion test and thus are unendurable to long-term mechanical agitation.

EXAMPLE 1

Nitrification Denitrification Test for Carrier

By the use of the nitrification denitrification apparatus as illustrated in FIG. 1, the raw water having the following composition was subjected to intermittent aeration treatment under the following operation conditions:

| Composition of raw water | Concentration (mg/L) |
|---|---|
| glucose | 61.8 |
| L-glutamic acid | 61.8 |
| Ammonium chloride | 93.2 |
| $KH_2PO_4$ | 4.3 |
| $CaCl_2.2H_2O$ | 46.3 |
| $MgSO_4.7H_2O$ | 32.4 |
| $ZnCl_2$ | 0.208 |
| $FeSO_4.7H_2O$ | 1.0 |
| EDTA.2Na | 1.8 |
| $CuSO_4.5H_2O$ | 0.51 |
| $MnCl_2.4H_2O$ | 0.072 |
| $Na_2MoO_4.2H_2O$ | 0.05 |
| $CoCl_2.6H_2O$ | 0.008 |

Operation Conditions
Volume of biotreatment tank: 20 liters
Aeration cycle: one cycle was constituted of 3 hours of aerobic aeration at a dissolved oxygen concentration of 6 mg/L, and 3 hours of anaerobic aeration under agitation with an agitation impeller
Raw water flow rate: added at 6.67 L/hr (80 L/day) only during anaerobic aeration
Retention time: 6.0 hour
Nitrogen concentration in raw water: 30 mg-N/L
Nitrogen load: 0.12 kg-N/$m^3$-tank·day
Sludge return: returned so as to attain MLSS concentration of 2000 mg/L
Water temperature: regulated to 22° C.
One liter of carrier A described hereunder as the specimen was added to the biotreatment tank.
Carrier A: water-swellable thermoplastic polyurethane in the form of columnar gel of 4 mm in diameter and 4 mm in length prepared in Preparation Example 2
Batch tests were optionally carried out for evaluating the carrier performance, and thus measurements were made of the nitrification rate and denitrification rate of the carrier A. The relation between the number of days of treatment from the start of test and the rate of nitrification is given in FIG. 2, and the relation between the number of days of treatment from the start of test and the rate of denitrification is given in FIG. 3.

As is seen from the figures, the nitrification performance was made stable after 30 days from the start of the test showing a rate of nitrification of about 2 kg-N/$m^3$-carrier·day at a water temperature of 22° C., and the denitrification performance was made stable after 40 days from the start of the test showing a rate of denitrification of about 1.5 kg-N/$m^3$-carrier·day. In addition, the carrier A exhibited good fluidity from the start of the test to the aerobic and anaerobic period without causing such trouble as floating or collapse of carrier throughout the testing period.

EXAMPLE 2

Nitrification Denitrification Test for Carrier

The procedure in Example 1 was repeated to carry out the intermittent aeration test except that 4 liter of the carrier A was added. The average water qualities of the treated water on and after 60th day from the start of the test are given in Table 3.

TABLE 3

| | Raw water | Treated water in Example 2 | Treated water in Comp. Example 3 |
|---|---|---|---|
| T-BOD (mg/L) | 100 | 3.4 | 5.8 |
| T-N (mg/L) | 30 | 2.2 | 5.9 |
| $NH_4$-N (mg/L) | 24.4 | 0.2 | 1.8 |
| $NO_3$-N + $NO_2$-N (mg/L) | ND | 0.8 | 3.9 |

As is shown in Table 3, the water qualities of the treated water on and after 60th day from the start of the test was made stable, showing $NH_4$—N and $NO_3$—N of less than 1 mg/L each, and a T—N removal rate of more than 90%. In addition, the carrier A exhibited good fluidity from the start of the test to the aerobic and anaerobic period without causing such trouble as floating or collapse of carrier throughout the testing period.

It is clarified from the comparison with the result in Comparative Example 3 that by the use of the carrier A in both the nitrification and the denitrification step, it is made possible to proceed with stable treatment and enhance nitrogen removal rate.

COMPARATIVE EXAMPLE 1

Nitrification Denitrification Test for Carrier

The procedure in Example 1 was repeated to carry out the intermittent aeration test except that one liter of carrier B described hereunder as the specimen was added to the biotreatment tank.
Carrier B: polyvinyl alcohol gel curable by ionic cross-kinking in the form of spherical gel of 4 mm in diameter prepared in Preparation Example 7
The relation between the number of days of treatment from the start of test and the rate of nitrification is given in FIG. 2, and the relation between the number of days of treatment from the start of test and the rate of denitrification is given in FIG. 3.
After all, the carrier B collapsed by mechanical agitation on 25th day from the start of the test, and flowed away from the biotreatment tank.

COMPARATIVE EXAMPLE 2

Nitrification Denitrification Test for Carrier

The procedure in Example 1 was repeated to carry out the intermittent aeration test except that one liter of carrier C described hereunder as the specimen was added to the biotreatment tank.

Carrier C: polypropylene tube in the form of hollow cylinder of 4 mm in diameter and 5 mm in length prepared in Preparation Example 9

The relation between the number of days of treatment from the start of test and the rate of nitrification is given in FIG. 2, and the relation between the number of days of treatment from the start of test and the rate of denitrification is given in FIG. 3.

After all, the nitrification performance was made stable after 50 days from the start of the test showing a rate of nitrification of about 0.8 kg-N/m$^3$-carrier·day at a water temperature of 22° C., and the denitrification performance was made stable at the same time showing a rate of denitrification of about 0.7 kg-N/m$^3$-carrier·day. However, the carrier C floated on and around the water surface from the start, and exhibited poor fluidity throughout the testing period.

COMPARATIVE EXAMPLE 3

Nitrification Denitrification Test Without the Use of a Carrier

The procedure in Example 1 was repeated to carry out the intermittent aeration test except that none of carrier was added to the biotreatment tank and the MLSS concentration was set to 3000 to 3500 mg/L. The average water qualities of the treated water on and after 60th day from the start of the test are given in Table 3.

In this test, sludge floatation in the settling tank was observed on and after 10th day from the start of the test, and the suspended sludge flowed out. The water qualities of the treated water in both the nitrification and the denitrification steps was not stable, showing a T—N removal rate of about 80%

COMPARATIVE EXAMPLE 4

Continuous Nitrification Test for Carrier

By the use of the nitrification denitrification apparatus as illustrated in FIG. 1, and by adding 4 liter of the carrier A in the biotreatment tank, the raw water having the following composition was subjected to continuous nitrification test under the following operation conditions. The relation between the number of days of treatment from the start of test and the rate of nitrification is given in FIG. 2

| Composition of raw water | Concentration (mg/L) |
| --- | --- |
| Ammonium chloride | 114.6 |
| KH$_2$PO$_4$ | 4.3 |
| CaCl$_2$.2H$_2$O | 46.3 |
| MgSO$_4$.7H$_2$O | 32.4 |
| FeSO$_4$.7H$_2$O | 1.0 |
| EDTA.2Na | 1.8 |
| ZnCl$_2$ | 0.208 |
| CuSO$_4$.5H$_2$O | 0.51 |
| MnCl$_2$.4H$_2$O | 0.072 |
| Na$_2$MoO$_4$.2H$_2$O | 0.05 |
| CoCl$_2$.6H$_2$O | 0.008 |

Operation Conditions
Volume of biotreatment tank: 20 liters
Aeration: agitational aeration was carried out so as to attain a dissolved oxygen concentration of 6 mg/L.
Raw water flow rate: 6.67 L/hr (160 L/day)
Retention time: 3.0 hour
Nitrogen concentration in raw water: 30 mg-N/L
Nitrogen load: 0.24 kg-N/m$^3$-tank·day
Sludge return: returned so as to attain MLSS concentration of 2000 mg/L
pH: neutralizingly set to 7.8
Water temperature: regulated to 22° C.

In this test, the nitrification performance was made stable after 60 days from the start of the test showing a rate of nitrification of about 2 kg-N/m$^3$-carrier·day at a water temperature of 22° C. as was the case with Example 1. It can be seen from the comparison between this result and the result in Example 1, that by the use of the carrier A not only in the nitrification step but also in the denitrification step as in Example 1, it is made possible to shorten the period of acclimatization up to the rise.

COMPARATIVE EXAMPLE 5

Continuous Denitrification Test for Carrier

By the use of the nitrification denitrification apparatus as illustrated in FIG. 1, and by adding 4 liter of the carrier A in the the biotreatment tank, the raw water having the following composition was subjected to continuous denitrification test under the following operation conditions. The relation between the number of days of treatment from the start of test and the rate of denitrification is given in FIG. 3

| Composition of raw water | Concentration (mg/L) |
| --- | --- |
| Methanol | 100.0 |
| NaNO$_2$ | 182.1 |
| KH$_2$PO$_4$ | 4.3 |
| CaCl$_2$.2H$_2$O | 46.3 |
| MgSO$_4$.7H$_2$O | 32.4 |
| ZnCl$_2$ | 0.208 |
| FeSO$_4$.7H$_2$O | 1.0 |
| EDTA.2Na | 1.8 |
| CuSO$_4$.5H$_2$O | 0.51 |
| MnCl$_2$.4H$_2$O | 0.072 |
| Na$_2$MoO$_4$.2H$_2$O | 0.05 |
| CoCl$_2$.6H$_2$O | 0.008 |

Operation Conditions
Volume of biotreatment tank: 20 liters
Agitation: mechanical agitation with agitation impellers d
Raw water flow rate: 6.67 L/hr (160 L/day)
Retention time: 3.0 hour
Nitrogen concentration in raw water: 30 mg-N/L
Nitrogen load: 0.24 kg-N/m$^3$-tank·day
Sludge return: returned so as to attain MLSS concentration of 2000 mg/L
Water temperature: regulated to 22° C.

In this test, the denitrification performance was made stable after 60 days from the start of the test showing a rate of denitrification of about 1.5 kg-N/m$^3$-carrier·day at a water temperature of 22° C. as was the case with Example 1. It can be seen from the comparison between this result and the result in Example 1, that by the use of the carrier A not only in the denitrification step but also in the nitrification step as in Example 1, it is made possible to shorten the period fo acclimatization up to the rise.

What is claimed is:
1. A process for nitrifying and denitrifying an organic compounds-bearing waste water, which comprises making use of a microbe carrier composed of a water-swellable organic thermoplastic high molecular compound in both a nitrifying step and a denitrifying step, wherein the com- pound has, in a state of complete swelling in water, a water absorption rate as defined by the formula (1) being in the range of 50 to 3500%, a compressive yield stress as defined by the formula (2) being at least 1.0 MPa and a particle diameter being in the range of 1.0 to 30 mm;

water absorption rate (%)={weight upon complete swelling in water (g)–bone dry weight (g)}×100/bone dry weight (g)  (1)

σ=F/A,  (2)

where σ is the compressive yield stress (MPa) of the carrier;
F is the compressive load (N) upon the compressive collapse of the carrier; and
A is the projected area (mm²) of the carrier before compression test.

2. The process for nitrifying and denitrifying organic compounds-bearing waste water according to claim 1, which comprises alternately and repeatedly making use of the microbe carrier in both the nitrifying step and the denitrifying step.

3. The process for nitrifying and denitrifying organic compounds-bearing waste water according to claim 1, wherein the water-swellable organic thermoplastic high molecular compound is a water-swellable thermoplastic polyurethane obtained by reacting a long-chain diol compound which has a number-average molecular weight in the range of 1000 to 13000 and which has two terminal hydroxy groups in one molecule, a short-chain compound which has a number-average molecular weight in the range of 30 to 400 and which has a group capable of reacting with two isocyanate groups in one molecule, and a diisocyanate compound.

4. The process for nitrifying and denitrifying organic compounds-bearing waste water according to claim 3, wherein the long-chain diol compound has an ethylene oxide content of at least 70% by weight.

5. The process for nitrifying and denitrifying organic compounds-bearing waste water according to claim 3, wherein the water-swellable thermoplastic polyurethane is obtained by reacting the long-chain diol compound, the short-chain compound which has a group capable of reacting with two isocyanate groups in one molecule, and the diisocyanate compound at an NCO/OH molar ratio in the range of 0.95 to 1.8.

6. The process for nitrifying and denitrifying organic compounds-bearing waste water according to claim 1, wherein the water-swellable organic thermoplastic high molecular compound contains at least 30% by weight of a water-swellable thermoplastic polyurethane obtained by reacting a long-chain diol compound which has a number-average molecular weight in the range of 1000 to 13000 and which has two terminal hydroxy groups in one molecule, a short-chain compound which has a number-average molecular weight in the range of 30 to 400 and which has a group capable of reacting with two isocyanate groups in one molecule, and a diisocyanate compound, the long-chain diol compound, the short-chain compound and the diisocyanate compound being reacted at an NCO/OH molar ratio in the range of 0.95 to 1.8.

7. The process for nitrifying and denitrifying organic compounds-bearing waste water according to claim 2, which comprises continuously or intermittently feeding the waste water to be treated in a treatment tank under the state of a microbe carrier being retained in the treatment tank, while alternately and repeatedly switching the treatment conditions between nitrification and denitrification.

8. The process for nitrifying and denitrifying organic compounds-bearing waste water according to claim 1, wherein particles of said microbe carrier have a particle diameter in a range of 3.0 to 10 mm.

9. The process for nitrifying and denitrifying organic compounds-bearing waste water according to claim 1, wherein the water-swellable organic thermoplastic high molecular compound is a water-swellable thermoplastic polyurethane copolymer comprising a relatively soft segment and a relatively hard segment.

10. The process for nitrifying and denitrifying organic compounds-bearing waste water according to claim 9, wherein the relativity soft segment is represented by the following formula:

(—O—X—O—CO—NH—Y—CO—)  (A)

wherein X is a group generated by reaction of terminal hydroxy groups of a long-chain diol compound with an isocyanate group of a diisocyanate, and from which the terminal hydroxy groups are removed, a number-average molecular weight of X being in a range of 1,000 to 13,000, and Y is a group generated by reaction of the diiscyanate, the diisocyanate having a number-average molecular weight in a range of 100 to 1000 with the hydroxy groups, and from which the isocyanate groups are removed.

11. The process for nitrifying and denitrifying organic compounds-bearing waste water according to claim 10, wherein the relatively hard segment is represented by at least one of the following formulas:

(—O—Z—O—CO—NH—Y—NH—CO—)  (B)

(—NH—Z—NH—CO—NH—Y—NH—CO—)  (C)

wherein Y has been previously defined, and Z is a group generated by reaction of terminal hydroxy groups of a short-chain diol compound having a number average molecular weight in an average of 30 to 400 with the isocyanate, and from which the terminal hydroxy groups are removed.

12. The process for nitrifying and denitrifying organic compounds-bearing waste water according to claim 3, wherein a molar ratio of the long-chain diol compound to the short-chain compound is in a range of 5:1 to 1:2.

13. The process for nitrifying and denitrifying organic compounds-bearing waste water according to claim 3, wherein the long-chain diol compound has a number-average molecular weight in a range of 4,000 to 8,000.

14. The process for nitrifying and denitrifying organic compounds-bearing waste water according to claim 1, wherein the water-swellable organic thermoplastic high molecular compound contains at least 30% by weight of a water-swellable thermoplastic polyurethane obtained by reacting a long-chain diol compound which has a number-average molecular weight in the range of 1000 to 13000 and which has two terminal hydroxy groups in one molecule, a short-chain compound which has a number-average molecular weight in the range of 30 to 400 and which has a group capable of reacting with two isocyanate groups in one molecule, and a diisocyanate compound.

15. The process for nitrifying and denitrifying organic compounds-bearing waste water according to claim 1, wherein the water-swellable organic thermoplastic high molecular compound contains at least 30% by weight of a water-swellable thermoplastic polyurethane obtained by reacting a long-chain diol compound which has a number-average molecular weight in the range of 1000 to 13000 and which has two terminal hydroxy groups in one molecule, a short-chain compound which has a number-average molecular weight in the range of 30 to 400 and which has a group capable of reacting with two isocyanate groups in one molecule, and a diisocyanate compound, the long-chain diol compound having an ethylene oxide content of at least 70% by weight.

* * * * *